United States Patent Office 3,819,818
Patented June 25, 1974

3,819,818
RECOVERY OF HYDROGEN PEROXIDE FROM AN AQUEOUS SOLUTION BY DISTILLATION WITH ORGANIC EXTRACTANTS
Gunter Giesselmann, Geusenstamm, Heinz Monch, Freigericht, Gerd Schreyer, Grossauheim, and Otto Weiberg, Neu Isenburg, Germany, assignors to Deutsche Gold- und Silber-Scheideanstalt vormals Roessler, Frankfurt am Main, Germany
No Drawing. Filed May 18, 1972, Ser. No. 254,425
Claims priority, application Germany, May 21, 1971, P 21 25 159.2
Int. Cl. B01j 9/22
U.S. Cl. 423—588                    20 Claims

ABSTRACT OF THE DISCLOSURE

Hydrogen peroxide is converted from an aqueous solution into vapor or liquid mixtures with non aqueous compounds by extracting aqueous solution of hydrogen peroxide with high boiling solvents which have a high selectivity for hydrogen peroxide and are resistant to hydrogen peroxide and water. A portion of the water also extracted is directly distilled from the resulting extraction mixture without addition of an entraining agent. Subsequently the hydrogen peroxide is vaporized in a vacuum from the water poor extract with addition in the vapor phase of the desired mixing partner which boils lower than the extracting agent whereupon the hydrogen peroxide containing vapors are drawn off or condensed. The hydrogen peroxide containing vapors can be purified by partial condensation and the high boiling solvent can be returned to the extraction step.

---

The present invention is concerned with a process for the conversion of hydrogen peroxide from an aqueous solution into a vapor or liquid mixture with non aqueous organic compounds.

The term "fluid" as used in the present specification and claims is employed in its normally accepted sense as including both gases (i.e. vapors) and liquids.

The purpose of the present invention is the conversion of aqueous hydrogen peroxide, preferably from the crude aqueous extracts which are obtained by different variants of the anthraquinone process into fluid, i.e. vapor or liquid mixtures with other low boiling compounds.

There have already been reported several processes which solve the stated problem. These processes, however, have considerable disadvantages compared to the present process.

It is known to produce hydrogen peroxide solutions in non aqueous solvents in which the solvent is mixed with aqueous hydrogen peroxide and the mixture freed from water by azeotropic distillation, in a given case with the addition of an entraining agent (see for example Webb British Pat. 931,119 and Rudolph German Auslegeschrift 1,262,982). These known processes require high energy and investment costs because purified aqueous hydrogen peroxide solutions must be employed as starting materials. These purified solutions are produced today almost exclusively by the total distillation of the crude extract of aqueous hydrogen peroxide obtained in the anthraquinone process. It is also known according to Kabisch et al. application 170,366, filed Aug. 9, 1971 now Pat. 3,743,706 (German Offenlegungsschrift 20 41 124.9) to produce hydrogen peroxide solutions in carboxylic acid esters having 4 to 10 carbon atoms starting with the crude aqueous extract of the anthraquinone process, while the hydrogen peroxide is transformed to the ester phase from the crude extract by extraction and the water simultaneously extracted is removed by azeotropic distillation. This process is more economical. However, it does not permit the separation of the high boiling organic impurities contained in the crude aqueous hydrogen peroxide extract, which in the extraction likewise are transformed into the carboxylic acid ester phase.

A mutual disadvantage of these known processes in which the water is removed from the aqueous starting solution of hydrogen peroxide by azeotropic distillation is that the solvent is in contact with the hydrogen peroxide for a long time at an elevated temperature and therefore undesired chemical reactions occur, as, for example, the perhydrolysis of esters and the formation of percarboxylic acids from carboxylic acids which can lead to the loss of peroxygen by distillation of the percarboxylic acids in the azeotropic dehydration or to the formation of peroxides. Besides the hydrogen peroxide solutions produced by these known processes must be vaporized if gaseous hydrogen peroxide mixtures are required which create a problem because of the possible increase in hydrogen peroxide concentration in the evaporator. According to Schreyer et al. application 79,315, filed Oct. 8, 1970 now Pat. 3,707,444 and parent Schreyer et al application 856,070, filed Sept. 8, 1969 (corresponding respectively to German Offenlegungsschrifts P 19 51 211.9 and P 18 02 003.6) likewise there is produced primarily vapor form hydrogen peroxide mixtures directly by vaporization of hydrogen peroxide from the working solution. This process, however, is not so favorable energywise since the hydrogen peroxide concentration in the known working solutions of the anthraquinone process amounts to a maximum of 1.5 weight percent. The entire disclosure of Schreyer et al. application 79,315 now Pat. 3,707,444 is hereby incorporated by reference.

It is the purpose of the present invention to produce hydrogen peroxide containing gaseous or liquid mixtures starting from the aqueous hydrogen peroxide solutions which are produced according to the anthraquinone process without purifying these previously by total distillation and at the same time avoiding the disadvantages attached to the known processes.

It has now been found that hydrogen peroxide can be converted from aqueous solution into gaseous or liquid mixtures with non aqueous organic compounds by extracting the aqueous hydrogen peroxide with high boiling solvents which have a high selectivity for hydrogen peroxide and are stable to hydrogen peroxide and water, whereupon a portion of the water also extracted is distilled off directly from the resulting extract without the addition of an entraining agent, subsequently vaporizing the hydrogen peroxide in a vacuum, e.g. 5 to 200 Torr, from the water poor (concentrated) hydrogen peroxide extract with addition of the desired mixing partner which boils lower than the extracting agent and which is either added in vapor form or is vaporized together with the hydrogen peroxide whereupon finally the hydrogen peroxide containing vaporized product, in a given case after purification by partial condensation is drawn off or condensed. The process of the invention can be carried out either continuously or discontinuously, e.g. batchwise. The high boiling solvent can be returned to the extraction step after distillation off of the hydrogen peroxide.

As aqueous hydrogen peroxide starting solutions there are employed those containing at least 15 weight percent hydrogen peroxide, especially those containing 40–55 weight percent. Preferably there is employed aqueous hydrogen peroxide directly from the extraction step in the anthraquinone process.

As high boiling extraction agents for the hydrogen peroxide there can be used liquids which have a vapor pressure of less than 20 Torr at 120° C. and which preferably take up hydrogen peroxide in comparison to water in the extraction so that the major amount of water is separated from the hydrogen peroxide by the extraction.

At the same time the separation of extraction agent dissolved in the aqueous raffinate should cause only small losses of extraction agent and for this reason there are preferably used as extraction agents which have so slight a solubility in water that it is not necessary to recover them from the raffinate. If the extraction agent is also included as solvent in the working solution of the anthraquinone process by which the hydrogen peroxide is produced, there is the possibility of returning the aqueous raffinate together with the dissolved extraction agent to the extraction step of the anthraquinone process. By this mode of action the removal of the high boiling extraction agent from the aqueous raffinate is managed in a very advantageous fashion. The requirements for the extraction agent are filled by esters of phosphoric acid or phosphonic acid having the formulae

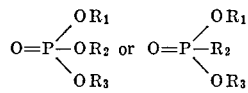

where $R_1$, $R_2$ and $R_3$ are the same or different alkyl or aryl groups and have a total of 12 to 27 carbon atoms. Examples of such phosphates and phosphonates are tributyl phosphate, dibutyl butane phosphonate, trioctyl phosphate, triamyl phosphate, tri-2-ethylhexyl phosphate, diphenyl butyl phosphate, triisobutyl phosphate, diphenyl octyl phosphate, triphenyl phosphate, diphenyl p-cresyl phosphate, tri o-cresyl phosphate, butyl diisoamyl phosphate, tri nonyl phosphate, triisoamyl phosphate, ethyl dioctyl phosphate, dibutyl pentane phosphonate, dioctyl methane phosphonate, dibutyl hexane phosphonate, dibutyl benzene phosphonate, dibutyl heptane phosphonate, dihexyl octane phosphonate, dibutyl decane phosphonate, dioctyl octane phosphonate, heptyl diisodecyl phosphate.

Also suitable are heteroaromatic compounds such as 2 - dimethylamino - 4 - diethylamino-1,3,5-triazines as well as the other liquid triazines set forth in Giesselmann et al. application 221,444, filed Jan. 27, 1972 now Pat. 3,789,114 (and the corresponding German application P 21 04 432.6). The entire disclosure of the Giesselmann et al. application is incorporated by reference. Thus there can be used 1,3,5-triazines of general formula I

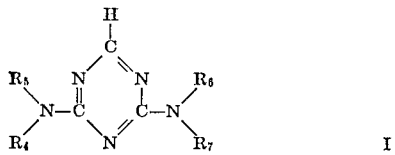

wherein $R_4$ is an alkyl group of 1 to 4 carbon atoms, preferably 1 to 2 carbon atoms, $R_5$, $R_6$ and $R_7$ defined as for $R_4$ and can be the same as or different from $R_4$.

Illustrative examples of suitable liquids within formula I are 2-dimethylamino-4-diethylamino-6-H-triazine,
2,4-bis(diethylamino)-6-H-triazine,
2-(N-methyl-N-n-butyl)-amino-4-di-n-propylamino-6-H-triazine,
2,4-bis(N-methyl-N-ethyl)-amino-6-H-triazine,
2-diethylamino-4-di-isopropylamino-6-H-triazine,
2-(N-methyl-N-ethyl)-amino-4-diethylamino-6-H-triazine and
2-(N-methyl-N-sec.butyl)-amino-4-diethylamino-6-H-triazine.

Likewise there can be used N,N-disubstituted amides in which there are bound to the N-atom two identical or different hydrocarbon groups, as for example N,N-diethyl-N',N'-dibutyl urea as well as the other substituted ureas set forth in Giesselmann et al. application 133,390, filed Apr. 12, 1971 now Pat. 3,767,778 (and the corresponding German application P 20 18 686.1). The entire disclosure of this Giesselmann et al. application is also incorporated by reference. Thus there can be used unsymmetrical and symmetrical tetra substituted liquid ureas of the following structure:

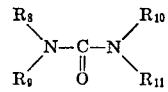

$R_8$ is alkyl of 1 to 12 carbon atoms, i.e., methyl to dodecyl, preferably 1 to 5, or more preferably 1 to 3 carbon atoms, which in a given case can be substituted by one or more $OR_{12}$ groups where $R_{12}$ is hydrogen or alkyl of 1 to 12 carbon atoms, preferably 1 to 3 carbon atoms, where the $OR_{12}$ group can be in the middle or at the end of the alkyl chain named under $R_8$.

$R_8$ can also be cycloalkyl having 5 or 6 ring carbon atoms which in a given case can be substituted by one or more alkyl groups with 1 to 5 carbon atoms and/or one or more $OR_{12}$ groups.

$R_8$ can be an aralkyl group in which the alkyl group can have 1 to 5 carbon atoms and the aromatic ring itself in a given case can be substituted by alkyl groups with 1 to 5 carbon atoms and/or $OR_{12}$ groups.

$R_9$ can be as defined for $R_8$ and $R_8$ and $R_9$ can be either identical or not identical.

$R_8$ and $R_9$ can be joined together to form a 5 or 6 atom ring system, in a given case, interrupted by a hetero atom such as N,O, S or P.

$R_{10}$ can be as defined for $R_9$ and can be the same or different.

$R_{11}$ can be as defined for $R_9$ and can be the same or different.

$R_{10}$ and $R_{11}$ can be joined as defined for $R_1$ and $R_9$.

Examples of suitable substituted ureas include tetramethyl urea, N,N-diethyl-N',N'di-n-butyl urea, N,N-dimethyl N',N'-methyl - 3 - methoxy - n - propyl urea, N,N-dimethyl - N',N'-methyl-2,3,5- or 6 methyl-4-methoxy-1-cyclohexyl ureas of the formula:

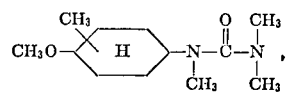

N,N-dimethyl-carbamoyl-N'-morpholine, tetraethyl urea, tetrapropyl urea, tetraisopropyl urea, N,N',N'-trimethyl-N-ethyl urea, N,N'-dimethyl N,N'-di(dodecyl) urea, N-methoxyethyl, N-methyl, N'N'-diethyl urea, N-amyloxymethyl, N,N',N'-trimethyl urea, N,N - dipropoxypropyl, N',N' diethyl urea, N,N'-dimethyl, N,N'-diamyl urea, tetracyclohexyl urea, N,N',N'-trimethyl N - cyclohexyl urea, N,N'-diethyl N,N'-di(4 - methylcyclohexyl) urea, N,N - diethyl carbamoyl piperidine, carbodimorpholine, N,N'-dimethyl carbamoyl-N'-thiomorpholine and N,N-diethyl carbamoyl-N'-oxazolidine.

There can also be used mixtures of all of the named solvents as extraction agents.

The extraction of the aqueous hydrogen peroxide solutions with the high boiling solvents is carried out in known extraction apparates. Especially advantageous are packed columns, perforated plate columns, or spray columns with or without pulsation. The extraction is carried out at temperatures between 0 and 60° C., preferably at room temperature and there is formed an extract containing 3 to 15 weight percent hydrogen peroxide, although these proportions can be varied.

The water which is also extracted is distilled off from the extract at normal pressure or in a vacuum, preferably at 40–110 torr at 40–120° C. The height of the distillation temperature is adjusted according to the hydrogen peroxide content and the required water content in the extract. The more the hydrogen peroxide is contained in the extract the lower is the distillation temperature, and the lower the water content to be attained the higher is the distillation temperature. If the steam contains noteworthy amounts of hydrogen peroxide the vapor is led through a heat exchanger (dephlegmator) or a column and the hydrogen peroxide is separated by partial condensation in the form of a highly concentrated aqueous solution and returned to the extraction.

There can be employed all known types of evaporators, preferably, however, there are used thin film evaporators or heated packed columns, or plate columns.

By the distillation of the water the water content based on the amount of hydrogen peroxide in the hydrogen peroxide solution in the extraction agent is reduced to at least 18 weight percent, preferably to 14-2 weight percent, and it can be reduced even further.

As pointed out above the hydrogen peroxide is evaporated from the dewatered extract with the addition of the desired mixing partner in a second process step, the distillation step.

The compounds to be admixed are preferably added in the second process step in vapor form. However, they can also be added in liquid form and be evaporated with the hydrogen peroxide in the same apparatus. A preferred process is that described in Schreyer et al. German Offenlegungsschrift 2,025,237 (date of laying open Dec. 9, 1971) for the evaporation of hydrogen peroxide directly from the working solution of the anthraquinone process. This operation is carried out under careful conditions in a vacuum at 5-200 Torr, preferably at 5-80 Torr. The hydrogen peroxide containing high boiling extraction agent is sent over a film forming evaporator apparatus, the hydrogen peroxide evaporated and together with the mixing party drawn off in vapor form in concurrent or counter-current flow.

The entire disclosure of Schreyer et al. Offenlegungsschrift 2,025,237 is hereby incorporated by reference. For convenience examples 1 and 2 thereof are reproduced below as examples A and B. Schreyer U.S. Pat. 3,737,519 corresponds to Offenlegungsschrift 2,025,237.

Example A

A working solution consisting of 2-ethyl anthraquinone, tetrahydroethyl anthraquinone and tri-n-butyl phosphate which contained 10 grams per liter of hydrogen peroxide, after preheating to 80° C. at 5 Torr was sent to a glass thin layer evaporator preheated to 155° C. From the end of the evaporator there was blown in overheated butyl acetate at 100° C. The vapor leaving the evaporator at 135° C. was cooled down to 53° C. in a heat exchanger and sent over a short column. A reflux ratio of 0.15 was established. The resulting solution of hydrogen peroxide in n-butyl acetate contained 12% hydrogen peroxide and was practically free of constituents of the working solution. There was obtained 99.5% of the hydrogen peroxide contained in the working solution.

Example B

A working solution according to example A was treated with 667 grams of cyclohexyl acetate for each 10 liters of oxidized working solution and after preheating to 80° C. at 15 Torr passed to a thin layer evaporator heated to 155° C. The vapors leaving the evaporator at 120° C. were cooled down in a heat exchanger and sent over a short column. A reflux ratio of 1.0 was established. The resulting solution of hydrogen peroxide in cyclohexyl acetate contained 15% of hydrogen peroxide and was practically free of the constituents of the working solution used. There was obtained 99% of the hydrogen peroxide contained in the working solution.

Thus, in a given case, small amounts of extraction agent contained in the hydrogen peroxide containing vapors in the present invention can be kept back by inserting a partial condensation (either a dephlegmator or small column with slight reflux).

The end temperature to which the extract must be heated depends on the working pressure as well as the properties of the components of the mixture and preferably is at 200° C. or below, but below 40° C.

By this procedure the hydrogen peroxide resides with its mixing partner for only a very short time as vapor in the hot zone so that both side reactions and the danger of explosion are avoided.

In the evaporation of the hydrogen peroxide in principle there can be employed all distillable organic compounds as mixing partners for the hydrogen peroxide whose boiling point at 5 Torr is below 80° C., which boil at the pressure of operation at least 70° C. below that of the extraction agent, do not form a constant boiling mixture with the extraction agent and which are chemically stable to the extraction agent.

As mixing partners there can be used among others the materials such as carboxylic acids, carboxylic acid esters, alcohols, ketones and ethers mentioned in the aforementioned Schreyer et al. application 79,315, filed Oct. 8, 1970 (and German applications P 18 02 003.6 and P 19 51 211.9) and Schreyer et al. German application 2,025,-237. Thus there can be used carboxylic acids especially those containing up to 5 carbon atoms including alkanoic acids such as formic acid, acetic acid, propionic acid, butyric acid, isobutyric acid, valeric acid and pivalic acid, fluoroacetic acid, esters including aliphatic and cycloaliphatic esters containing up to 11 carbon atoms in the molecule such as ethyl acetate, propyl acetate, butyl acetate, propyl formate, butyl formate, isobutyl acetate, t-butyl acetate, amyl acetate, isoamyl acetate, hexyl acetate, methyl propionate, ethyl propionate, methyl butyrate, ethyl butyrate, methyl valerate, methyl isovalerate, isopropyl acetate, 2-ethylbutyl acetate, sec-hexyl acetate, propyl propionate, isopropyl propionate, butyl propionate, isobutyl propionate, amyl propionate, propyl butyrate, isobutyl butyrate, methyl isobutyrate, ethyl isobutyrate, propyl isobutyrate, isopropyl isobutyrate, ethyl fluoroacetate, isobutyl isobutyrate, amyl isobutyrate, ethyl valerate, methyl isovalerate, propyl isovalerate, methyl caproate, alcohols containing up to 9 carbon atoms such as propanol, butanol, isobutyl alcohol, amyl alcohol, hexyl alcohol, cyclohexanol, sec. butyl alcohol, t-butanol, 2-ethylhexyl alcohol, isooctyl alcohol, isononyl alcohol. The alcohols can be primary, secondary or tertiary. There can also be used esters of acids of the formula:

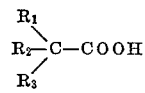

where $R_1$, $R_2$ and $R_3$ are lower alkyl, i.e. $R_1$ is alkyl with 1 to 4 carbon atoms and $R_2$ and $R_3$ alkyls with 1 to 2 carbon atoms. Thus, there can be used esters of pivalic acid, 2,2 - dimethylpentanoic acid, neodecanoic acid, 2,2,4,4-tetramethyl valeric acid. Thus there can be used lower alkyl esters of pivalic acid such as methyl pivalate, ethyl pivalate, propyl pivalate, isopropyl pivalate, butyl pivalate, sec. butyl pivalate, amyl pivalate and hexyl pivalate. There also can be used, for example, methyl neodecanoate, ethyl 2,2-dimethyl pentanoate. There also can be used esters of unsaturated alcohols, such as allyl acetate, allyl propionate and crotyl acetate as well as esters of cycloaliphatic alcohols such as cyclohexyl acetate, cyclohexyl butyrate, cyclohexyl propionate, cyclohexyl pivalate, cyclohexyl formate, methyl cyclohexyl acetate and cyclopentyl acetate.

Besides there can be used aliphatic and cycloaliphatic ethers of monohydric or dihydric alcohols having a molecular weight up to 160 such as diethyl ether, diisopropyl ether, dibutyl ether, diisobutyl ether, di sec. butyl ether, dipropyl ether, di-t-butyl ether, cyclohexyl methyl ether, dioxane, dioxolane, diamyl ether, di-isoamyl ether, ethyl propyl ether, propyl butyl ether, ethylene glycol dimethyl ether, propylene glycol dimethyl ether, methyl ethyl ether of ethylene glycol, methyl ethyl ether of propylene glycol.

Also there can be used aliphatic and cycloaliphatic ketones with 3-9 carbon atoms, for example acetone, methyl ethyl ketone, methyl isobutyl ketone, cyclohexanone, di-isopropyl ketone and dibutyl ketone.

There can also be used mixtures of such materials including for example, acetic acid-di-n-propyl ether, acetic acid-methyl ethyl ethylene glycol ether, di-isopropyl ether-t-butyl acetate, di-isopropyl ether-t-butyl acetate-benzene, acetic acid-n-butyl acetate, acetone-benzene, propionic acid-propyl propionate, propyl acetate-acetic acid, propyl acetate-propanol. For example, in each of the two and three component mixtures just mentioned there can be used equal parts by volume of each component of the mixture.

There can not only be used mixtures of these mixing partners with compounds of the same class but there can be used mixtures with compounds of different classes. Furthermore, there can be used mixtures of the illustrative compounds with saturated or unsaturated hydrocarbons which contain a maximum of 80% of the hydrocarbon. The pure hydrocarbons are not capable of being employed since they are not miscible with hydrogen peroxide. Illustrations of suitable mixtures are 60% butyl acetate-40% benzene and 50% amyl acetate-50% toluene.

The concentration of hydrogen peroxide in the mixture with the low boiling compound can be varied in a wide range and for example can be up to 40 weight percent. It can be as little as 1 weight percent.

The technical advance, as already mentioned, is in the following advantages of the process of the invention. It permits the production of water poor hydrogen peroxide containing mixtures starting from non distilled aqueous hydrogen peroxide solutions. The separation of the water from the hydrogen peroxides does not take place by total distillation of the aqueous solution and does not take place by entraining distillation which causes high energy costs, but by extraction and selective water distillation from the extraction agent. The comparably low hydrogen peroxide concentration both in the aqueous solutions and in the extraction agent during the entire running of the process guarantees a high degree of safety and therefore permits higher throughputs than the former processes. Through the method of mixing which requires only a short total residence time of hydrogen peroxide and its mixing partner at elevated temperature reactions of the hydrogen peroxide with the added compound is largely prevented. The process is especially advantageous if gaseous hydrogen peroxide containing mixtures are required since it is problematic to vaporize the organic hydrogen peroxide solutions resulting from known processes. Finally, above all there can be produced gaseous organic mixtures having a very high hydrogen peroxide content. This was not previously possible.

Unless otherwise indicated, all parts and percentages are by weight. The invention is further illustrated by the following examples.

Example 1

There were pumped at 23° C. into a pulsating extraction column (11 meters long, 25 mm. in diameter filled with Raschig rings 1.76 kg. of tri-(2-ethylhexyl)-phosphate (TOF) and 194 grams of 50% aqueous hydrogen peroxide per hour. After reaching equilibrium there ran off from the bottom of the column hourly 78 grams of a 5.1% aqueous solution of hydrogen peroxide as raffinate which contained less than 0.01 weight percent of TOF. From the top of the extraction column there were drawn off hourly 1.76 kg. of TOF, 93 grams of hydrogen peroxide and 23 grams of water as an extract and this mixture was sent at 48 Torr over a thin film evaporator which was so heated that there was a sump temperature of 70° C. The vapor was drawn off countercurrently and condensed. There were obtained 11 grams of 0.3 weight percent of aqueous hydrogen peroxide per hour.

From the sump of the evaporator there were drawn off 1.865 kg./hour of a 4.98 weight percent hydrogen peroxide solution in TOF which still contained 0.64 weight percent water. The water poor hydrogen peroxide solution in TOF running off from the dewatering step was preheated to 80° C. and passed at 31 torr over a thin film glass evaporator preheated to 150° C. At the bottom of the evaporator there was blown in countercurrently per hour 347 grams of propionic acid vapor which was superheated to 130° C. The hydrogen peroxide containing vapor leaving the evaporator at 102° C. was cooled to 70° C. by passage through a heat exchanger and led to a condenser by way of a 20 cm. long packed column in which a reflux ratio (R:E) of 0.2 prevailed. There was obtained per hour a solution consisting of 91 grams of hydrogen peroxide, 13 grams of water and 302 grams of propionic acid. When the 4 grams of hydrogen peroxide in the aqueous raffinate were considered, the yield of hydrogen peroxide amounted to 98% of what was added.

Example 2

There were pumped at 20° C. into a pulsating perforated plate column (3.50 meters long, 2 cm. diameter) countercurrently 1.05 kg. of N,N-diethyl-N',N'-di-n-butylurea (DADBH) and 300 grams of 50% aqueous hydrogen peroxide per hour. After reaching equilibrium there ran off from the bottom of the column 137 grams of 17.6% aqueous hydrogen peroxide as raffinate which contained 0.4% DADBH. From the top of the perforated plate column there were drawn off hourly 1.05 kg. DADBH, 126 grams of hydrogen peroxide and 35.5 grams of water and this mixture was passed over a glass thin film evaporator at 95 Torr which was so heated that there was a sump temperature of 86° C. The vapors were drawn off countercurrently and condensed. There were obtained 30.4 grams of 8.6% aqueous hydrogen peroxide per hour. From the sump of the evaporator there were drawn off 1.182 kg./hour of a 10.2% hydrogen peroxide solution in DADBH which still contained 0.93% water. The water poor hydrogen peroxide solution in DADBH running off from the dewatering step was preheated to 90° C. and at 52 Torr passed over a glass thin layer evaporator heated to 150° C. At the bottom of the evaporator there was blown in countercurrently per hour 1.4 kg. of butyl acetate vapor which was superheated to 140° C. The hydrogen peroxide containing vapors leaving the evaporator at 104° C. were cooled to 67° C. by passage through a heat exchanger and led to a condenser by way of a 20 cm. long packed column in which a reflux ratio (R:E) of 0.2 prevailed. There were obtained per hour 1.51 kg. of an 8.1% hydrogen peroxide solution in butyl acetate which contained 0.73% of water. If the hydrogen peroxide in the aqueous raffinate is considered, the hydrogen peroxide yield amounted to 97%.

Example 3

By stepwise countercurrent extraction in separatory funnels at 20° C. starting with a 35% aqueous hydrogen peroxide and tri-n-butyl phosphate (TBF) there was obtained a 7.4% hydrogen peroxide solution in TBF which contained 4.3% water, 600 grams of this solution was heated slowly to 94° C. at 110 Torr in a flask, whereupon 24 grams of 8% aqueous hydrogen peroxide distilled off. The TBF solution remaining behind contained 7% hydrogen peroxide and 0.8% water.

Subsequently there was dropped in 750 grams of n-butyl acetate at 50 Torr to 560 grams of the water poor hydrogen peroxide solution in TBF with heating to 160° C. Thereby there were collected 788 grams of a 4.8% hydrogen peroxide solution in butyl acetate as distillate which also contained 0.66% water. The hydrogen peroxide yield amounted to 91% based on the hydrogen peroxide solution in the TBF extract.

Example 4

By stepwise countercurrent extraction in separatory funnels at 22° C. starting with a 40% aqueous hydrogen peroxide and a mixture which consisted of 50% 2-dimethylamino-4-diethylamino-1,3,5-triazine (DMDAT) and 50% diethyl-di-n-butylurea (DADBH) there was obtained an 11.9% hydrogen peroxide solution in DMDAT/DADBH which also contained 6% water, 600 grams of this solution was heated slowly to 86° C. at 95 torr in a flask whereupon 30.1 grams of 6% aqueous hydrogen peroxide distilled off. The DMDAT/DADBH solution remaining behind contained 11.5% hydrogen peroxide and 1.7% water.

Subsequently there were dropped in 1.2 kg. of n-butyl acetate at 30 Torr to 550 grams of the water poor hydrogen peroxide solution in the DMDAT/DADBH mixture with heating to 140° C. Thereby there were collected 1.26 kg. of a 4.9% hydrogen peroxide solution in butyl acetate as distillate which also contained 0.8% water. The hydrogen peroxide yield amounted to 92.6% based on the amount of hydrogen peroxide in the DMDAT/DADBH extract.

It will be observed in the examples that the amount of water in the product was about 3.2% in example 1 and was less than 1% in examples 2, 3 and 4. Thus the product was substantially anhydrous.

We claim:

1. A process for converting hydrogen peroxide from an aqueous solution into a fluid mixture with a nonaqueous compound comprising extracting an aqueous solution containing at least 15% hydrogen peroxide with an organic solvent having a high boiling point and having a vapor pressure below 20 torr at 120° C., having a high selectivity for hydrogen peroxide and having stability to hydrogen peroxide and water directly distilling from the resulting extraction mixture containing hydrogen peroxide dissolved in said solvent a portion of the water also extracted therewith without using an entraining agent, thereafter vaporizing the hydrogen peroxide from the water poor extract and adding to the vapor phase a second organic solvent having a lower boiling point and miscible with hydrogen peroxide, said second solvent boiling at a temperature of not over 80° C. at 5 torr and boiling substantially lower than the extracting solvent and recovering the mixture of hydrogen peroxide and said lower boiling solvent, wherein said higher boiling organic solvent comprises a phosphate or phosphonate of the formula:

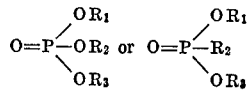

where $R_1$, $R_2$ and $R_3$ are alkyl or aryl groups which together have a total of 12 to 27 carbon atoms, or a triazine of the formula:

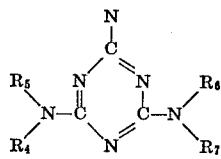

where $R_4$, $R_5$, $R_6$ and $R_7$ are alkyl of 1 to 4 carbon atoms or a substituted urea of the formula:

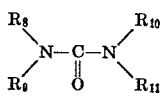

where $R_8$, $R_9$, $R_{10}$ and $R_{11}$ are alkyl of 1 to 12 carbon atoms, alkyl of 1 to 12 carbon atoms substituted by —$OR_{12}$ where $R_{12}$ is hydrogen, alkyl of 1 to 12 carbon atoms, cycloalkyl of 5 to 6 carbon atoms, cycloalkyl of 5 to 6 carbon atoms substituted by alkyl of 1 to 5 carbon atoms or by $OR_{12}$, aralkyl having 1 to 5 carbon atoms in the alkyl group, or $R_8$ and $R_9$ are joined together to form a 5 to 6 member heterocyclic ring including a N, O, S or P atom, or $R_{10}$ and $R_{11}$ are joined together to form a 5 to 6 member heterocyclic ring including a N, O, S or P atom; and said lower boiling organic solvent comprises an alkanoic acid having 1 to 5 carbon atoms, or an alkyl, alkenyl or cycloalkyl ester of an alkanoic acid, said ester having up to 11 carbon atoms in the molecule, or a dialkyl ketone or a cycloalkanone having up to 9 carbon atoms, or an aliphatic or cycloaliphatic ether of a monohydric or dihydric alcohol having a molecular weight up to 160.

2. A process according to claim 1, wherein the solvent comprises an aliphatic or cycloaliphatic ether of a monohydric or dihydric alcohol having a molecular weight up to 160.

3. A process according to claim 1 wherein the mixture is recovered by condensing a vapor phase mixture of hydrogen peroxide and said lower boiling solvent to form a solution of hydrogen peroxide in said lower boiling solvent.

4. A process according to claim 1 including the further step of returning the high boiling solvent to the extraction step.

5. A process according to claim 1 wherein the starting aqueous hydrogen peroxide solution contains 40 to 55% hydrogen peroxide.

6. A process according to claim 1 wherein the lower boiling organic compound boils at least 70° C. below the high boiling solvent at the temperature in the vacuum.

7. A process according to claim 6 wherein the water content is reduced by the partial distillation to below 18% of the hydrogen peroxide.

8. A process according to claim 7 wherein the water content is reduced by the partial distillation to 2–12% of the hydrogen peroxide.

9. A process according to claim 7 wherein the starting aqueous hydrogen peroxide contains 40 to 55% hydrogen peroxide.

10. A process according to claim 1 wherein the high boiling organic solvent is a phosphate or phosphonate of the formula

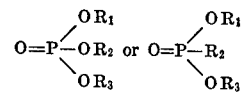

where $R_1$, $R_2$ and $R_3$ are alkyl or aryl groups which together have a total of 12 to 27 carbon atoms.

11. A process according to claim 1 wherein the high boiling solvent is a triazine of the formula

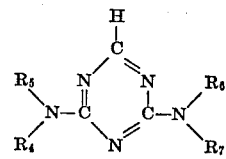

where $R_4$, $R_5$, $R_6$ and $R_7$ are alkyl of 1 to 4 carbon atoms.

12. A process according to claim 11 where the triazine is 2-dimethylamino-4-diethylamino-1,3,5-triazine.

13. A process according to claim 1 wherein the high boiling solvent is a substituted urea of the formula

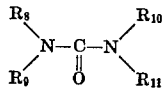

where $R_8$, $R_9$, $R_{10}$ and $R_{11}$ are alkyl of 1 to 12 carbon atoms, alkyl of 1 to 12 carbon atoms substituted by —$OR_{12}$ where $R_{12}$ is hydrogen, and alkyl of 1 to 12 carbon atoms, cycloalkyl of 5 to 6 carbon atoms, cycloalkyl of 5 to 6 carbon atoms substituted by alkyl of 1 to 5 carbon atoms or by $OR_{12}$, aralkyl having 1 to 5 carbon atoms in the alkyl group, or $R_8$ and $R_9$ are joined together to form a 5 to 6 member heterocyclic ring including a N, O, S or P atom, or $R_{10}$ and $R_{11}$ are joined together to form a 5 to 6 member heterocyclic ring including a N, O, S or P atom.

14. A process according to claim 13 where $R_8$, $R_9$, $R_{10}$ and $R_{11}$ are alkyl of 1 to 5 carbon atoms, alkyl of 1 to 5 carbon atoms substituted by $OR_{12}$ where $R_{12}$ is alkyl of 1 to 3 carbon atoms, cycloalkyl of 5 to 6 carbon atoms having up to 1 methyl or methoxy substituent, or $R_8$ and $R_9$ are joined together to form a 5 to 6 membered heterocyclic ring including not over one oxygen or sulfur atom, or $R_{10}$ and $R_{11}$ are joined together to form a 5 to 6 member heterocyclic ring including not over one oxygen or sulfur atom.

15. A process according to claim 14 wherein the substituted urea is N,N-diethyl-N',N'-dibutyl urea.

16. A process according to claim 1 wherein the lower boiling organic compound is an alkanoic acid having 1 to 5 carbon atoms.

17. A process according to claim 1 wherein the lower boiling organic compound is an alkyl, alkenyl or cycloalkyl ester of an alkanoic acid, said ester having up to 11 carbon atoms in the molecule.

18. A process according to claim 1 wherein the lower boiling organic compound is a dialkyl ketone or a cycloalkanone having up to 9 carbon atoms.

19. A process according to claim 1 wherein the extraction is carried out at 0 to 60° C., said water portion is distilled off at 40 to 120° C. and the hydrogen peroxide is distilled off at 40 to 200° C. at 5 to 200 torr.

20. A process according to claim 6 wherein the starting aqueous hydrogen peroxide solution contains 40 to 55% hydrogen peroxide and the water content is reduced by the partial distillation to 2–12% of the hydrogen peroxide.

References Cited

UNITED STATES PATENTS

| | | | |
|---|---|---|---|
| Re. 25,114 | 1/1962 | Hood | 23—312 W |
| 3,737,519 | 6/1973 | Schreyer | 423—540 |
| 3,043,666 | 7/1962 | Siwinski | 423—589 |
| 3,707,444 | 12/1972 | Schreyer | 203—61 |
| 3,617,219 | 11/1971 | Cook | 423—588 |

NORMAN YUDKOFF, Primary Examiner

H. H. BERNSTEIN, Assistant Examiner

U.S. Cl. X.R.

203—42, 60, 58, 61, 63